United States Patent
Muhlbauer

(10) Patent No.: US 8,469,668 B2
(45) Date of Patent: Jun. 25, 2013

(54) HYDRAULICALLY CONTROLLED VARIABLE PITCH PROPELLER

(75) Inventor: Gerd Muhlbauer, Mitterfels (DE)

(73) Assignee: MT-Propeller Entwicklung GmbH, Atting (DE)

( * ) Notice: Subject to any disclaimer, the term of this patent is extended or adjusted under 35 U.S.C. 154(b) by 1012 days.

(21) Appl. No.: 12/283,754

(22) Filed: Sep. 16, 2008

(65) Prior Publication Data
US 2009/0180883 A1 Jul. 16, 2009

(30) Foreign Application Priority Data
Jan. 11, 2008 (DE) .......................... 10 2008 004 197

(51) Int. Cl.
*B64C 11/38* (2006.01)
(52) U.S. Cl.
USPC ........................... 416/156; 416/155; 416/158
(58) Field of Classification Search
USPC .......................................... 416/155, 156, 158
See application file for complete search history.

(56) References Cited

U.S. PATENT DOCUMENTS

| | | | |
|---|---|---|---|
| 2,468,635 A | | 4/1949 | Maystead |
| 3,711,221 A | * | 1/1973 | Almqvist ................... 416/157 R |
| 3,802,800 A | * | 4/1974 | Merkx et al. .............. 416/157 R |
| 4,114,517 A | * | 9/1978 | Teramachi ........................... 92/2 |
| 4,379,678 A | * | 4/1983 | Carlock et al. .................. 416/98 |
| 5,042,966 A | | 8/1991 | Schwartz et al. |
| 6,196,801 B1 | * | 3/2001 | Muhlbauer ............... 416/157 R |
| 6,981,439 B2 | * | 1/2006 | Hart ............................... 91/509 |
| 2009/0180876 A1 | * | 7/2009 | Muhlbauer ...................... 416/46 |

FOREIGN PATENT DOCUMENTS

| | | |
|---|---|---|
| DE | 1960066002 C2 | 4/1998 |
| DE | 19743739 A1 | 4/1999 |
| EP | 1623921 A1 | 2/2006 |
| EP | 1623921 A1 * | 2/2006 |
| GB | 737745 A | 9/1955 |
| GB | 773745 A * | 9/1955 |
| WO | WO-02/16739 A2 | 2/2002 |

OTHER PUBLICATIONS

"European Application Serial No. 08003176.8, European Search Report mailed Oct. 24, 2011", (w/ English Translation), 11 pgs.
"European Application Serial No. 08004469.6, European Search Report mailed Oct. 24, 2011", (w/ English Translation), 11 pgs.
"European Application Serial No. 08004469.6, Office Action mailed Jun. 29, 2012", (w/ English Translation), 6 pgs.
"European Application Serial No. 08004469.6, Reply filed Apr. 20, 2012 to Office Action mailed Nov. 28, 2011", (w/ English Translation), 4 pgs.

* cited by examiner

*Primary Examiner* — Matthew W Such
*Assistant Examiner* — David Spalla
(74) *Attorney, Agent, or Firm* — Benjamin C. Armitage; Billion & Armitage

(57) ABSTRACT

Proposed is a redundant hydraulically controlled variable pitch propeller for an air, land or water craft, comprising at least two propeller blades (14) mounted in a propeller hub (12) for variable pitch control by means of a hydraulically powered piston assembly (18). In accordance with the invention the piston assembly (18) comprises two mechanically interconnected servo pistons (20, 22) each assigned an independent hydraulic circuit.

4 Claims, 2 Drawing Sheets

HYDRAULICALLY CONTROLLED VARIABLE PITCH PROPELLER

RELATED APPLICATIONS

The present application claims priority under 35 U.S.C. 119 to German Patent Application No. 10 2008 004 197.1, filed Jan. 11, 2008, which is hereby incorporated by reference.

The invention relates to a redundant hydraulically controlled variable pitch propeller for an air, land or water craft having the features as set forth in the preamble of claim 1.

Such a variable pitch propeller is known in practice which comprises a hydraulic means including a piston assembly by means of which the pitch of the propeller blades can be varied.

A variety of devices and methods are known in principle for varying the pitch of propeller blades, it usually being the case that these involve hydraulic systems provided single or dual acting by means of which the pitch can be automatically and continuously varied as to an assigned engine power, propeller RPM and flight speed. These known systems feature a servo piston, meaning that no pitch variation is possible when the hydraulic system fails. In order to prevent hazardous overspeeding, means are included to block the pitch change of the propeller blades. Known, in particular, is to install counterweights in the blade shank region of each propeller blade which, however, adds undesired weight.

Further, to prevent hazardous overspeeds on dual acting pitch change systems with a failure of the hydraulics the usual pitch control systems comprise what is called a pitch lock device, which locks the blade angle in the position which existed at the point in time of the pressure loss.

The invention is based on the object of defining a hydraulically controlled variable pitch propeller featuring a hydraulic system which ensures high operational safety of the propeller without the aforementioned safeguards.

This object is achieved in accordance with the invention by a hydraulically controlled variable pitch propeller having the features as set forth in claim 1.

Consequently in accordance with the invention, a redundant hydraulically controlled variable pitch propeller system for an air, land or water craft is proposed, comprising at least two propeller blades mounted in the region of a propeller hub for variable pitch control by means of a hydraulically powered piston assembly. In accordance with the invention the piston assembly comprises two mechanically interconnected servo pistons, each assigned to an independent hydraulic circuit.

A variable pitch propeller in accordance with the invention is now possible to control a piston assembly even when one of the two independent hydraulic circuits malfunctions, so that varying the pitch of the propeller blades is still assured. This assures high safety of operation of a variable pitch propeller system without having counterweights on the blade shanks or providing a pitch lock as aforementioned. Both servo pistons are so dimensioned that in case of one hydraulic circuit malfunctions, varying the pitch of the propeller blades is possible solely by the other hydraulic circuit.

In one preferred solution of the variable pitch propeller in accordance with the invention, the two hydraulic circuits comprise a common valve assembly by means of which the two servo pistons are activated synchron with a servo pressure. This valve assembly comprises, for example, two control spools operated by a common actuator and which are positioned by the hydraulic or servo pressure in which the two pistons of the propeller assembly are arranged in the propeller hub, for changing the blade pitch.

In one special arrangement of the valve, in accordance with the invention, the valve assembly and the servo pistons are interconnected by a double-walled control tube, comprising a ring-shaped passageway assigned to one of the two hydraulic circuits and an axial passageway assigned to the other of the two hydraulic circuits.

The control tube can cooperate with the two control spools of the valve assembly, each assigned to one of the hydraulic circuits. In particular the outer tube of the double-walled control tube comprises two control ports staggered axially, one of which ports into the axial passageway and the other into the ring-shaped passageway of the control tube.

The control valve comprises in particular two independent hydraulic chambers supplied by two independent pressure sources and hydraulically connected via the control tube to pressure spaces, each assigned to one of the servo pistons, the control tube also mechanically connecting the valve assembly to the pistons of the propeller assembly.

The control valve may also comprise two control spools, each actuated independently of the other and each assigned to one of the servo pistons in supplying hydraulic fluid to the two servo pistons, each independently of the other, to maintain pitch control even when one of the hydraulic circuits fails.

The control valve is mounted normally on the gearbox of an engine for the drive of the propeller. Expediently the control tube passes through the gearbox into the propeller hub, making the hydraulic connections between the control valve and the pressure spaces for the servo pistons.

The pressurized hydraulic fluid used for the two hydraulic circuits can be supplied statically with a constant pressure by means of a pump or dynamically by means of a propeller governor.

Further advantages and advantageous aspects of the invention are shown from the description, the drawing and the claims.

An example of a variable pitch propeller in accordance with the invention will now be described with reference to its simplified illustration in the drawing in which.

Figure 1:
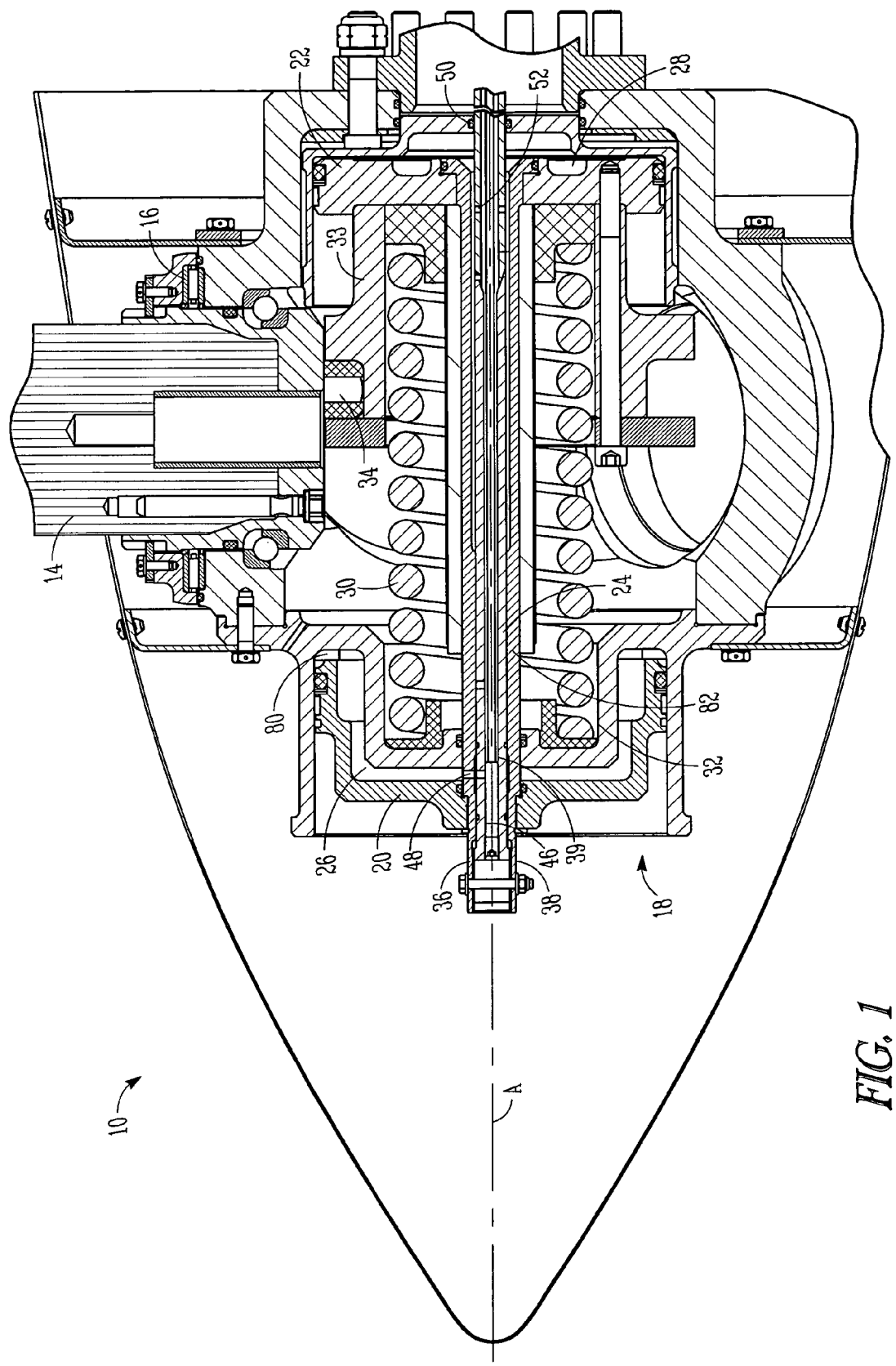
FIG. 1 is a longitudinal section through a propeller hub.

Referring now to FIG. 1 there is illustrated a hydraulically controlled variable pitch propeller 10 comprising a propeller hub 12 and at least two propeller blades 14 with assigned bearings 16 and of variable pitch.

Housed in the propeller hub 12 is a piston assembly 18 comprising two servo pistons 20 and 22 mechanically interconnected by a connecting tube 24 sited in the axis A of the propeller hub 12. The servo piston 20 borders on a first pressure space 26 assigned a first hydraulic circuit. The servo piston 22 borders on a second pressure space 28 assigned a second hydraulic circuit.

Housed furthermore in the propeller hub 12 is a return spring 30 supported by a hub cover 32 and on which the end of the servo piston 22 facing away from the second pressure space 28 acts on the piston assembly 18 to preload it in an end position as shown in FIG. 1. Connected to the piston assembly 18 is a piston extension 33 varying the pitch of the propeller blades 14 via a pin 34 on actuation of the piston assembly 18.

Figure 2:
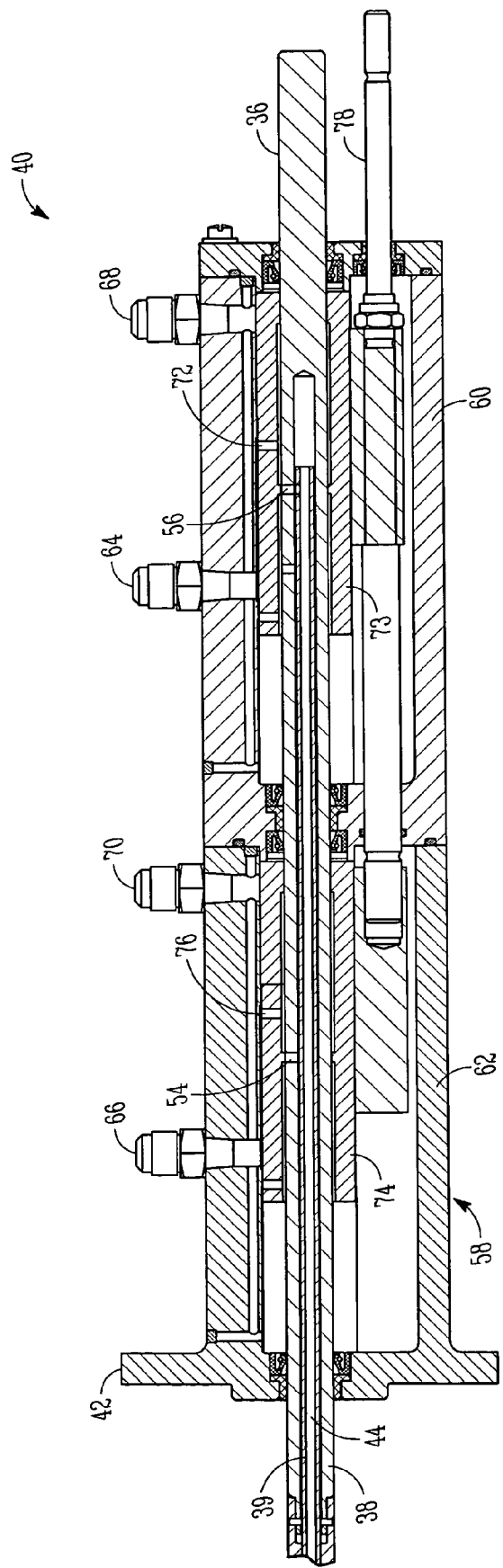
FIG. 2 is a longitudinal section through a control valve for varying the pitch of propeller blades.

Located in the connecting tube 24 is a double-walled control tube 36 fixedly secured to the connecting tube 24, comprising an outer tube 38 and an inner tube 39 whilst hydraulically communicating the pressure spaces 26 and 28 to a control valve 40 as shown in FIG. 2, from which it is obvious that the control valve 40 is mounted with a flange 42 to the rear of a gearbox (not shown) of the engine (likewise not shown). The double-walled control tube 36 consequently passes through the gearbox.

The inner tube 39 of the double-walled control tube 36 surrounds a first hydraulic passageway 44 assigned to the first hydraulic circuit and fluidly communicating by a transverse drilling 46 of the outer tube 38 and a transverse drilling 48 of the connecting tube 24 in alignment with the transverse drilling 46, the pressure space 26 being assigned to the first servo piston 20.

Disposed between the inner tube 39 and the outer tube 38 is a second hydraulic passageway 50 fluidly communicating via a transverse drilling 52 of the outer tube 38 with the pressure space 28 assigned to the second servo piston 22.

For supplying the hydraulic passageways 44 and 50 with hydraulic fluid the outer tube 38 is closed off at the end facing away from the propeller hub 12, comprises two further transverse drillings 54 and 56, the latter fluidly communicating with the axial hydraulic passageway 44 and the transverse drilling 54 fluidly communicating with the hydraulic passageway 50 ring-shaped design.

The control valve 40 through which the double-walled control tube 36 passes comprises a two-part valve body 58, a first valve body member 60 being assigned the first hydraulic circuit and a second valve body member 62 fluidly communicating with the first valve body member 60 being assigned the second hydraulic circuit. Each of the two valve body members 60 and 62 is provided with a servo pressure port 64 and 66 respectively fluidly communicating with a pressure source assigned to the corresponding hydraulic circuit which may be configured as a pump or also as a propeller governor. In addition, the two valve body members 60 and 62 each comprise a return port 68 and 70 respectively.

Arranged in the valve body member 60 is a first control spool 73 which communicates via control ports 72 with the transverse drilling 56 of the outer tube 38 of the control tube 36. Located slidingly in the valve body member 62 is a second control spool 74 which communicates via control ports 76 with the transverse drilling 54 of the outer tube 38 of the double-walled control tube 36 assigned to the second hydraulic circuit.

The control spools 73 and 74 are connected by a common actuating rod 78 extending in the axial direction of the control valve 40 and slidingly positioned by means of a suitable actuator axially to position the control spools 73 and 74. It is this positioning of the control spools 73 and 74 by means of the actuating rod 78 that the hydraulic pressure communicated via the hydraulic passageways 44 and 50 to the servo pistons 20 and 22 is varied so that the piston assembly 18 is positioned axially in varying the pitch of the propeller blades 14. A reduction in the servo pressure in the pressure spaces 26 and 28 results in the servo pistons 20 and 22 being moved up to a mechanical stop 80 for a brake (reverse) or feathering position by the effect of the return spring 30 and the pitch change forces created by the propeller blades 14. In the other direction a mechanical stop 82 in the form of a sleeve is provided which surrounds the connecting tube 24 and cooperates with the hub cover 32 of the propeller hub 12.

The invention claimed is:

1. A hydraulically controlled variable pitch propeller for an air, land or water craft, comprising at least two propeller blades mounted in a propeller hub with variable pitch control by means of a hydraulically powered piston assembly,
   wherein the piston assembly comprises two mechanically and fixedly interconnected servo pistons each coupled to an independent hydraulic circuit; and
   a common control valve by which the two servo piston are moved synchronous with a desired servo pressure,
   wherein the control valve and the servo pistons are interconnected by a double-walled control tube, comprising a ring-shaped passageway coupled to one of the two hydraulic circuits and an axial passageway coupled to the other of the two hydraulic circuits.

2. The hydraulically controlled variable pitch propeller as set forth in claim 1, wherein the control tube cooperates with two control spools of the control valve, each coupled to one of the hydraulic circuits.

3. The hydraulically controlled variable pitch propeller as set forth in claim 1, wherein the control valve comprises two independent hydraulic chambers supplied by two independent pressure sources and hydraulically connected via the double-walled control tube to the pressure spaces each coupled to one of the servo pistons.

4. The hydraulically controlled variable pitch propeller as set forth in claim 1, wherein the two servo pistons are configured so that varying the pitch of the propeller blades is assured under all operating conditions with just one of the servo pistons moved by the hydraulic fluid.

* * * * *